(12) United States Patent
Pattantyus et al.

(10) Patent No.: US 7,818,998 B2
(45) Date of Patent: Oct. 26, 2010

(54) DETECTING IONIZATION SIGNAL FOR HCCI ENGINES USING A DUAL GAIN AND DUAL BIAS VOLTAGE CIRCUIT

(75) Inventors: Tamas I. Pattantyus, Ann Arbor, MI (US); Guoming George Zhu, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 58 days.

(21) Appl. No.: 12/241,873

(22) Filed: Sep. 30, 2008

(65) Prior Publication Data

US 2010/0077845 A1 Apr. 1, 2010

(51) Int. Cl.
*G01M 15/00* (2006.01)

(52) U.S. Cl. .................................................. 73/114.67

(58) Field of Classification Search .................... None
See application file for complete search history.

(56) References Cited

U.S. PATENT DOCUMENTS

| 2004/0085070 A1* | 5/2004 | Daniels et al. ............... 324/391 |
| 2007/0186902 A1* | 8/2007 | Zhu et al. ............... 123/406.34 |
| 2009/0101114 A1* | 4/2009 | Czekala et al. ............... 123/480 |

* cited by examiner

*Primary Examiner*—Andre J Allen
(74) *Attorney, Agent, or Firm*—Dickinson Wright PLLC

(57) ABSTRACT

Disclosed is a way to detect ionization within a cylinder of an internal combustion engine where the engine selectively operates in either a spark ignition mode or a HCCI mode. A single ionization detector circuit adapts in response to a control input to alter its bias voltage and its gain to selectively enable effective detection of ionization for each of two different operational modes of an internal combustion engine.

8 Claims, 5 Drawing Sheets

DETECTING IONIZATION SIGNAL FOR HCCI ENGINES USING A DUAL GAIN AND DUAL BIAS VOLTAGE CIRCUIT

TECHNICAL FIELD

This invention relates generally to homogeneous charge compression ignition (HCCI) engines and, more particularly, to circuitry to control operation of HCCI engines.

BACKGROUND INFORMATION

In a HCCI engine, the fuel and oxidizer are mixed together similarly as they would be in a spark ignition engine (gasoline engine). In contrast to the homogeneous charge spark ignition engine, which uses an electric discharge to ignite a portion of the fuel/oxidizer mixture, a HCCI engine depends upon spontaneous reaction when the density and temperature of the mixture are raised by compression. until the entire mixture reacts spontaneously. This is similar to a stratified charge compression ignition engine (diesel engine) which also relies on temperature and density increase resulting from compression. However, rather than being spontaneous as in the HCCI engine, combustion occurs in a diesel engine at the boundary of fuel-air mixing, caused by an injection event; introduction of fuel into the already compressed oxidizer is what initiates combustion.

In both the homogeneous charge spark ignition and the stratified charge compression ignition (HCSI) engines, the burn starts at one (or possibly a few) place and propagates through the fuel/air mixture. In the gasoline (an engine, the flame initiates at an electrical discharge point and propagates through a premixed homogeneous charge of air and fuel. In the diesel (SCCI) engine the flame starts near the one or more injection points via auto-ignition and propagates through a heterogeneous mixture at the moving boundary of fuel air mixing. Under HCCI conditions, a homogeneous mixture of fuel, air, and residual gasses from previous cycles are compressed until auto-ignition occurs. Combustion initiates substantially simultaneously at multiple sites throughout the combustion chamber and there is no discernable flame propagation.

HCCI engines have a number of advantages: hydrocarbon and CO emissions on par with gasoline engines, efficiency on par with diesel engines, and nitrogen oxide (NOx) emissions that are substantially better than either gasoline or diesel engines. HCCI engines produce no soot and can operate using gasoline, diesel fuel, and many alternative fuels.

A salient aspect of HCCI engines is that the fuel/air mixture burn virtually simultaneously because ignition starts at several places across the cylinder at once. With no direct initiator of combustion, the HCCI process is inherently challenging to control. To enable dynamic operation in an HCCI engine, the control system changes the conditions that induce combustion. Thus, relevant parameters for the engine to control include: the compression ratio, inducted gas temperature, inducted gas pressure, fuel-air ratio, quantity of retained or reinducted exhaust, and blend of fuel types.

Another salient aspect of HCCI engines is that they have a narrow power range because spontaneous ignition occurs around a single designed operating point. An engine having a single operating point is certainly useful in a hybrid vehicle. On the other hand, most applications require an engine to be able to modulate its output to meet fluctuations of demand by an operator. For high load operation, the engine may switched over to operate in a spark ignition (SI) mode, leaving HCCI operation for more moderate load operation.

Due to different characteristics of the HCCI and SI combustions, the in-cylinder ionization signals are quite different, both in magnitude and shape. The ionization signal magnitudes during HCCI combustion is typically more than a factor of ten lower than during SI combustion due to different combustion characteristics (summarized above). As a result, it is very difficult (nearing impossible) to detect ionization current during HCCI combustion mode using an ionization detection circuit that was originally designed for an SI combustion only context.

What is needed is an apparatus for effective detection of ionization signals in an engine that operates in a HCCI mode as well as a SI mode.

SUMMARY OF THE INVENTION

In general terms, this invention provides a dual gain circuit and a dual bias voltage circuit for detecting ionization signal using nominal gain and bias voltage when the engine is operated at SI combustion mode and using high gain and bias voltage for MCCI combustion mode.

According to one aspect of the invention, a detected ionization signal is amplified with a selectable gain controlled by a control input.

According to another aspect of the invention, an ionization detection bias voltage is selectable based upon a control input to improve detectability of ionization during HCCI operation of an internal combustion engine.

According to yet another aspect of the invention, a single circuit for operating an ionization detector is responsive to a control input to alter its bias voltage and its gain to selectively enable effective detection of ionization for two different operational modes of an internal combustion engine.

According to embodiments of the present invention, a dual gain circuit detects ionization signal using a nominal gain when the engines is operated at SI combustion mode and using a high gain for HCCI combustion mode. An advantage of this signal ionization detection circuit is that it is useful for detecting ionization signal at both HCCI and SI operational modes without additional sensing elements.

These and other features and advantages of this invention will become more apparent to those skilled in the art from the detailed description of a preferred embodiment. The drawings that accompany the detailed description are described below.

DETAILED DESCRIPTION

An ionization detection system uses a spark plug as a sensor to observe an in-cylinder combustion process. A bias voltage is applied between the spark plug's center and ground electrodes, and current conduction across the spark plug gap increases monotonically with the amount of ionization present in the cylinder. When the engine is operated at SI mode, the flame starts at the spark plug gap and gradually moves away, and the ionization signal may have more detailed information about in-cylinder combustion than an in-cylinder pressure signal. When the SI engine load is high enough the ionization signal is useful to locate the in-cylinder pressure peak.

Figure 1:
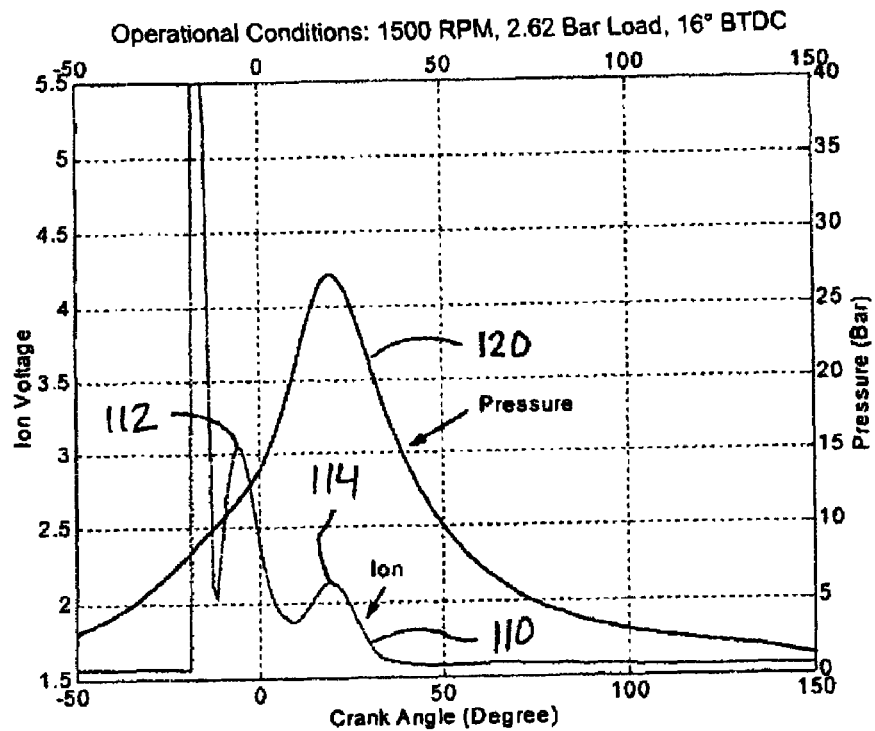
FIG. 1 illustrates a typical ionization signal and its corresponding in-cylinder pressure signal in a SI combustion mode.

Referring to FIG. 1, a typical ionization signal 110 is shown for a two-liter four-cylinder SI engine operated at 1500 RPM with 2.62 Bar BMEP, along with the corresponding in-cylinder pressure signal 120. A typical ionization signal for the engine running in SI combustion mode has two peaks. The first peak 112 is due to the initial flame kernel development right after the spark. When the flame front leaves the spark plug, the magnitude of the ionization signal reduces. As the pressure in the cylinder increases rapidly, the combusted mixture around the spark plug gap is ionized again due to the high temperature resulted from the combustion, that generates the second peak 114.

Unlike a traditional SI or Diesel engine, HCCI combustion takes place spontaneously and homogeneously without flame propagation. When the engine is operated in a HCCI combustion mode, the detected ionization signal through the spark plug gap provides local combustion information around the spark plug gap.

Figure 2:
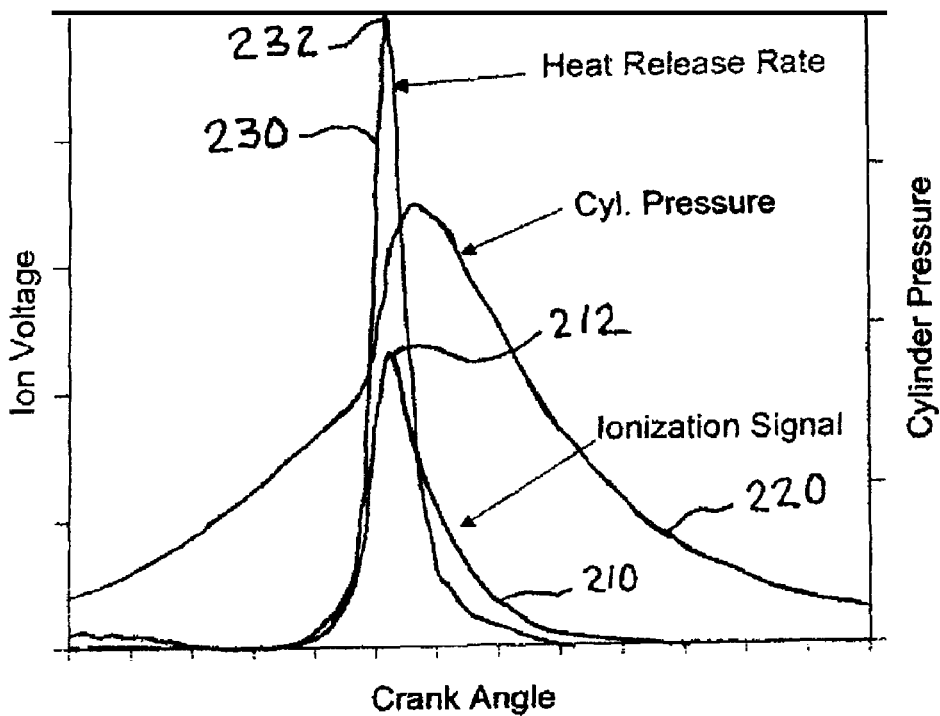
FIG. 2 illustrates a typical ionization signal, along with its corresponding in-cylinder pressure signal and heat release rate in a HCCI combustion mode.

Referring to FIG. 2, a typical ionization signal 210 is shown, along with its corresponding in-cylinder pressure signal 220 and heat release rate 230, in a HCCI combustion mode. The ionization signal 210 for the engine running in HCCI mode has only one peak 212. This signal peak 212 is due to the spontaneously and homogeneously HCCI combustion. The characteristics of the ionization signal are very close to the heat release rate curve 230, which is calculated from an in-cylinder pressure signal 220. In fact, the peak locations 212, 232 of both ionization and heat release rate are almost the same. Due to the lean operation of the HCCI combustion, the magnitude of the HCCI ionization signal (on the order of tens of microamps) is relatively small comparing with the SI signal (on the order of hundreds of microamps).

Due to low Compression Ratio (CR) gasoline burning HCCI engines obtain advantages by having the flexibility to switch to a SI mode at high load. This ability to revert to an SI mode overcomes the HCCI limitation of a narrow operation range. Thus, a dual mode HCCI/SI internal combustion engine is very practical.

Figure 3:
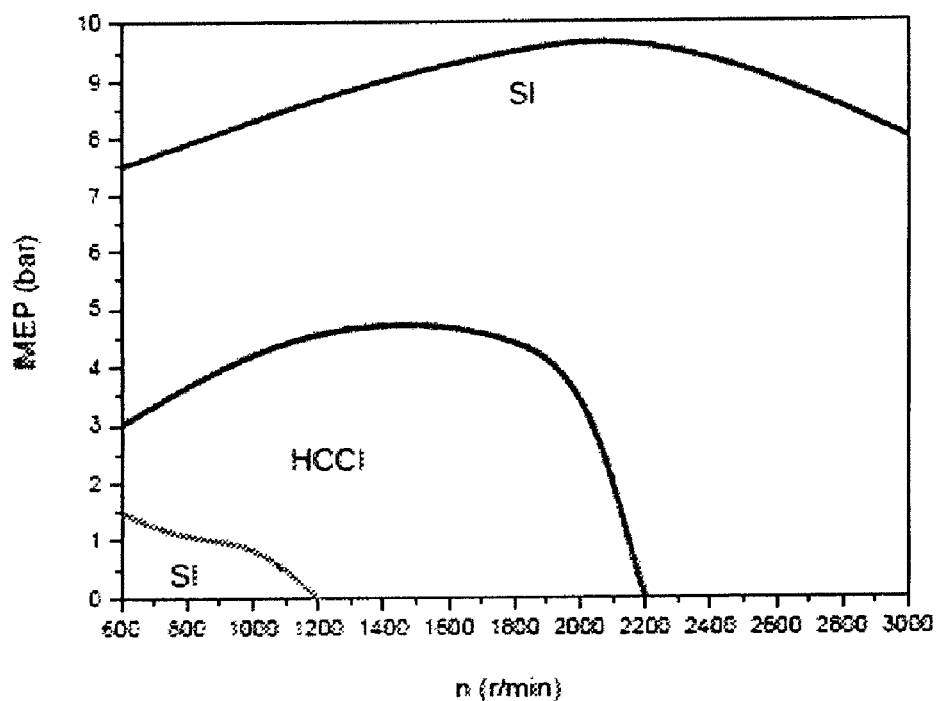
FIG. 3 illustrates operational regions for SI and HCCI combustions in terms of cylinder pressure versus rotational frequency.

Referring to FIG. 3, a graph of cylinder pressure versus rotational frequency shows the typical operation regions of the different combustion modes in a combined HCCI/SI combustion gasoline engine. During the cold-start operation, a stratified local rich fuel/air mixture near the spark plug should be formed in the compression stroke and then ignited by the spark. After the warm-up running, the engine goes into the HCCI combustion region from low to mediate load to have a high thermal efficiency and very low engine-out NOx emission. From mediate high to high load, the engine runs on an SI combustion for high power output. An ionization detection system for this engine should have the ability to detect ionization signal for both SI and HCCI combustion modes. Considering the wide variance in ionization signal size between these two modes, the detection system adapts dynamically to detect ionization signal at different signal levels with consistent signal to noise level. This detection system uses variable bias voltage and gains to detects an ionization signal for an HCCI engine operated alternatively at SI and HCCI combustion modes.

Figure 4:
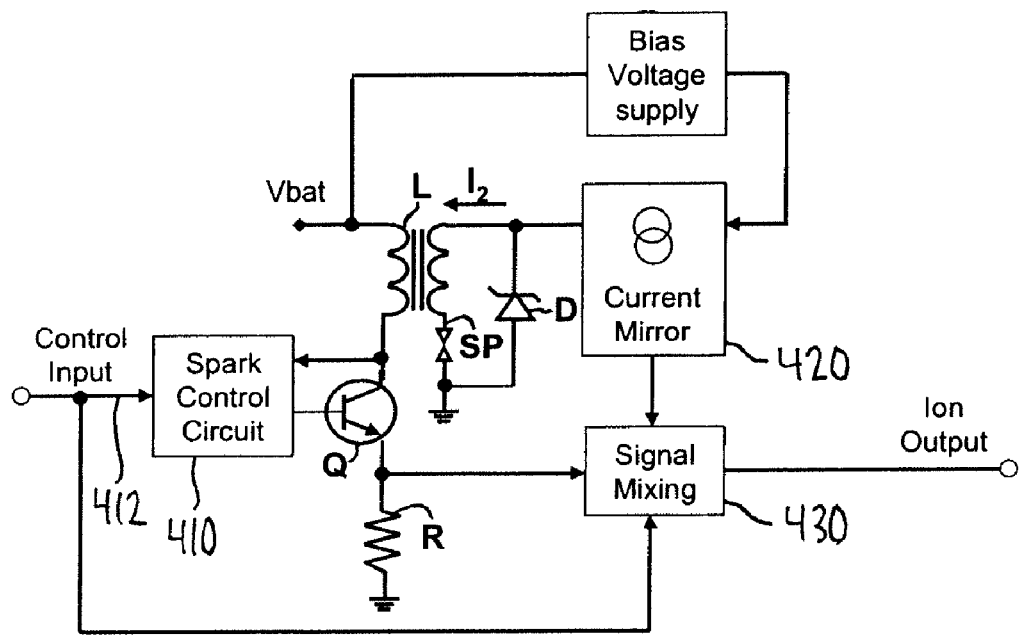
FIG. 4 illustrates a conventional ionization detection system architecture.

Referring to FIG. 4, a conventional ionization detection system is shown, having an is ignition coil L, an Insulated Gate Bipolar Transistor (IGBT) Q that turns the ignition coil L on and off, a spark plug SP, a Zener diode D with its breakdown voltage being higher than the ionization bias voltage, and a dwell current feedback resistor R. The spark control circuit 410 controls the IGBT Q, based upon an ignition control input signal 412, in a soft turn-on fashion. The voltage developed across the dwell current feedback resistor R is proportional to the actual dwell current.

Figure 5:
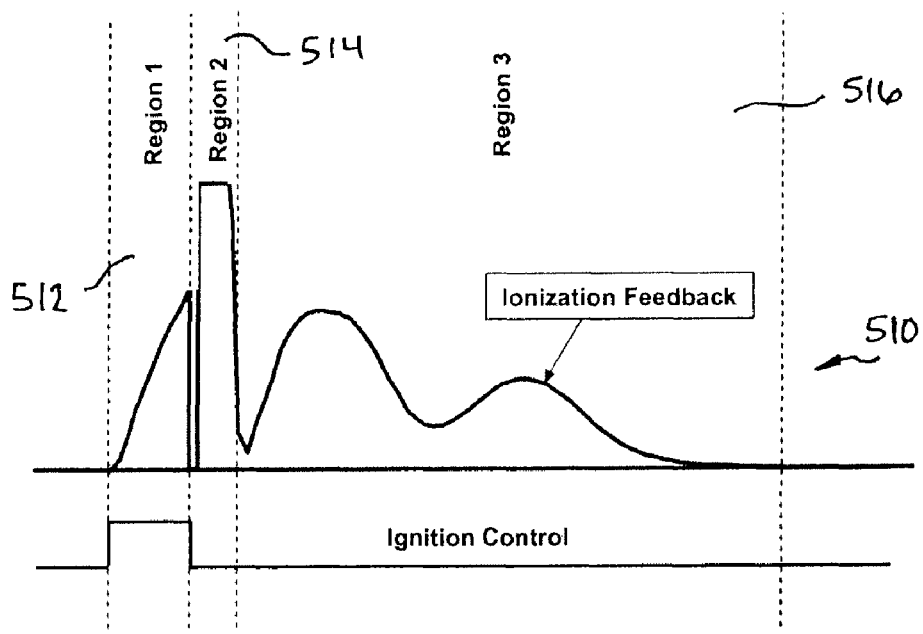
FIG. 5 illustrates three regions of a typical ionization signal waveform.

Referring to FIG. 5, a waveform plot shows three regions of a typical ionization signal 510 as output according to a detection system as shown in FIG. 4. After the falling edge of the ignition control input 412, the voltage across the spark plug gap SP increases sharply, breaks down the air-to-fuel mixture, and generates an ignition current I2 flowing into the ground. Therefore, the voltage across the Zener diode D is negative during this period and the ionization current mirror 420 provides a saturated current due to the bias voltage applied to the Zener diode D. After the spark (or ignition) current is diminished, the current mirror circuit 420 provides the combustion ionization signal. The ionization signal 510 is divided into three regions, where the first region 512 is the dwell current signal provided by the current feedback resistor R, the second region 514 is the spark duration signal provided by current mirror circuit during the spark period, and the third region 516 is the combustion ionization signal provided by the current mirror circuit 420. A signal mixing circuit 430 switches the ionization output to dwell current signal when ignition control is active and switches back to spark and ionization signal provided by the current mirror circuit 420.

Figure 6:
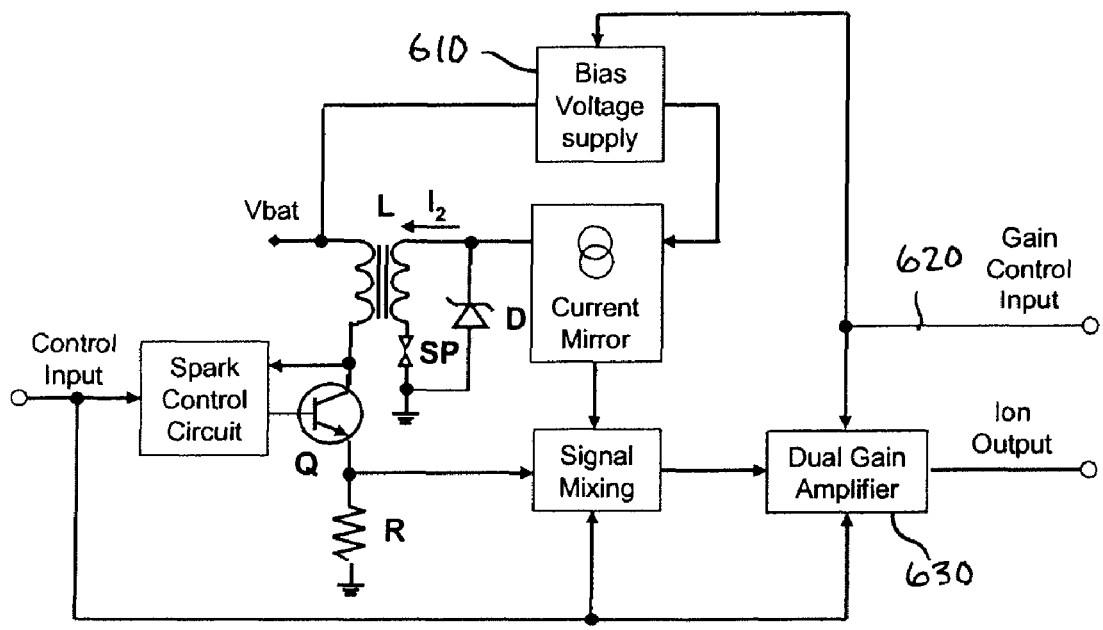
FIG. 6 illustrates a variable gain ionization detection system architecture according to a first embodiment of the present invention.

Referring to FIG. 6, a variable gain ionization detection system architecture is shown according to a first embodiment of the present invention. In order to detect in-cylinder ionization signal during both SI and HCCI combustion operations, this invention proposed to use different ionization bias voltage and gain at different operational modes. In contrast to the conventional ionization detection circuit shown in FIG. 4, which has a bias voltage supply 610 based upon flyback voltage, system architecture of FIG. 6 is capable of provide a dual bias voltage controlled by an external control input 620. The system architecture of FIG. 6 also includes a dual gain amplifier circuit 630 that amplifies the third region 516 only of the ionization signal. Gain is controlled by the same external control input 620 as that controlling selection of bias voltage supply 610. This control input 620 may be generated by and received from a Powertrain Control Module (PCM), or equivalent control circuitry. For example, the gain control input 620 is high during SI combustion and low during HCCI combustion.

Figure 7:
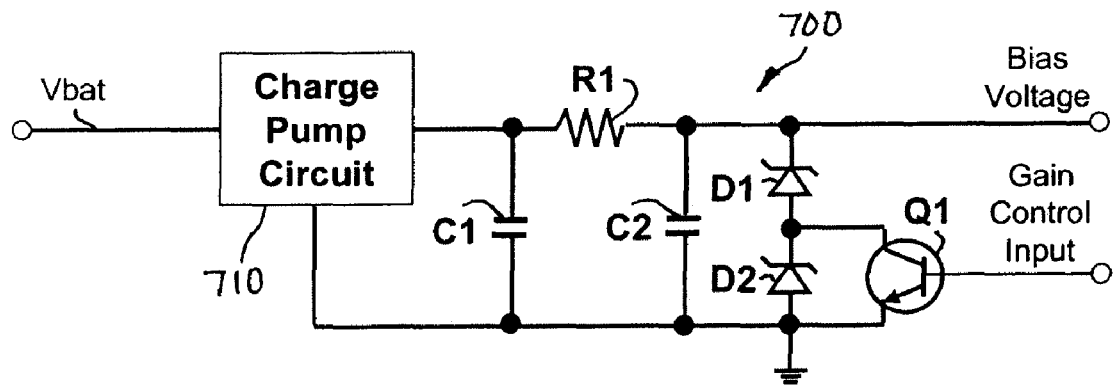
FIG. 7 illustrates a dual bias voltage supply suitable for practice according to embodiments of the present invention.

Referring to FIG. 7, a schematic of a dual bias voltage supply circuit 700 useful for practice of the present invention is shown. For the dual bias voltage supply circuit 700, a DC to DC charge pump circuit 710 is used to provide a bias voltage using a battery supplied voltage Vbat that is greater that the sum of breakdown voltages of a pair of series Zener diodes D1, D2. The charge pump 710 output charges capacitor C2 through resistor R1 and the ionization bias voltage output is determined according to the breakdown voltage of the Zener diodes D1, D2. When the gain control input is low (i.e., during HCCI combustion), a switching transistor Q1 is switched off and the bias voltage output equals to the sum of the breakdown voltages of the Zener diodes D1, D2. As an example, the sum of the breakdown voltages of the Zener diodes D1, D2 is 150 volts. Alternatively, when the gain control input is high, the switching transistor Q1 is switched on, and the bias voltage output equals to the breakdown voltage of only one of the Zener diodes D1, where the collect-to-emitter voltage drop across conducting transistor Q1 is negligibly small compared to the breakdown voltage. As an example, the breakdown voltage of the Zener diode D1 is 100 volts.

The ionization detection electronics is optionally integrated on to the ignition coil for both pencil and on-plug coils to maximize the signal to noise ratio. A good reason to do this is the fact that an ionization signal has an amplitude on the order of hundreds of microamps, and a long wiring harness between spark plug and detection circuit would introduce additional electrical noise to the detected ionization signal due to environmental electric and magnetic fields. When integrated thusly, a five pin (minimum) connector for the ionization detection coil is appropriate. The five lines are: battery voltage, ground, ignition control input, ionization signal output, and gain control input.

As described before, the magnitude of the ionization signal during SI and HCCI combustion modes is quite different. In many situations it is anticipated that the difference is as large as a factor of ten. This causes a scaling problem for the PCM (Power Control Module) to read the ionization signal into the microprocessor. Amplifying the ionization signal inside the PCM would also amplify the additional noise introduced by the engine harness between PCM and ignition coil. Therefore, amplifying the ionization signal with the ionization detection electronics, according to embodiments of the present invention, provides an improved signal to noise ratio.

Figure 8:
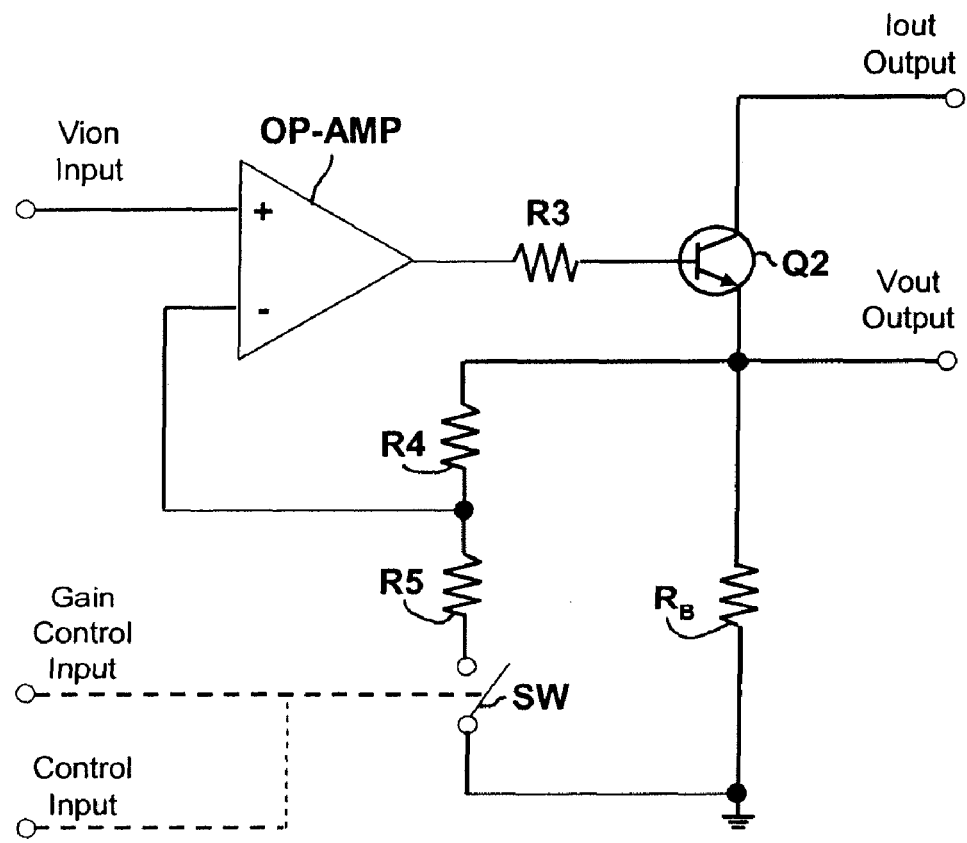
FIG. 8 illustrates circuit implementation of dual-gain amplifier for use in embodiments of the present invention.

A circuit schematic is shown in FIG. 8 for a dual gain amplifier that is configured to suit both voltage-in/voltage-out and voltage-in/current-out requirements.

The amplifier has an operational amplifier OP-AMP, a switch SW and a transistor Q2. The transistor Q2 is optionally either a bipolar transistor or a MOSFET; for purpose of illustration a bipolar transistor is shown. The switch SW can be a mechanical device, a movable strap or a low impedance electronic switch, such as a MOSFET. The emitter resistors R4, R5 are much larger than the ballast resistor $R_B$.

Input voltage Vion is a voltage derived from the ionization signal Iion and a resistor Rion. When the switch SW is open the negative node of the OP-AMP is derived from the emitter of the transistor Q2, through the emitter resistor R4. thus Output voltage Vout matches Vion. This is the case of unity gain. If the output must be the current signal proportional to the input, then the ballast resistor $R_B$ is chosen to be equal to Rion.

When a higher gain is required, the switch SW is closed. The output voltage Vout is attenuated by the voltage divider formed by the emitter resistors R4, R5 and the Vout/Vion ratio (or gain) is given by (R4+R5)/R5. The amplified current output Iout is equal to Vout/Rem, where Rem is the parallel combination of (R4+R5) and the input resistor $R_B$. Thus Iout can be written as $$Vout/Vion = (R4+R5)/R5$$

$$Iout = Vout/Rem$$

$$Iout = Vion \times [(R4+R5)/R5]/[(R4+R5) \times R_B/(R4+R5+R_B)],$$

after simplification which yields $$Iout = Vion \times (R4+R5+R_B)/(R5+R_B)$$

or $$Iout \approx (Vion/R5) \times [(R4+R5)/R_B], \text{ if } R_B << R4+R5.$$

The current gain (GI), therefore, is given by $$GI = [Vion \times (R4+R5)/R5/R_B]/[Vion/R_B] = (R4+R5)/R5.$$

Note that by adding more switches and more voltage dividers to the emitter load of transistor Q2, amplification of the ionization sensor circuit can optionally have three or more selectable gain settings.

Figure 9:
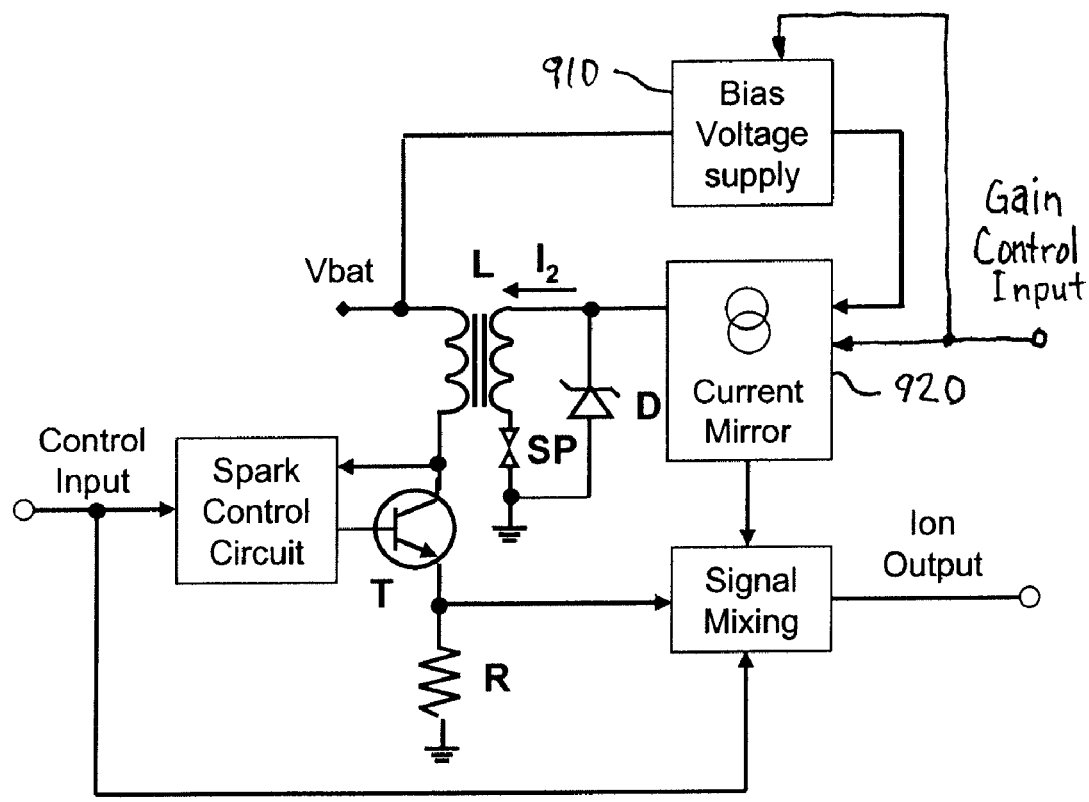
FIG. 9 illustrates a variable gain ionization detection system architecture according to a second embodiment of the present invention.

Referring to FIG. 9, another implementation architecture of a variable bias voltage and gain ionization detection circuit according to an embodiment of the present invention is shown. In this case the bias voltage supply 910 remains unchanged, unlike in FIG. 6, and the amplification of the ionization signal is moved from a separate circuit into the ionization detection current mirror circuit 920.

The control inputs of the dual-gain amplifier are control input and gain control input. In order maintain unit gain during the dwell period, the switch SW is open whatever the gain control input is. The switch SW is closed only when the gain control input is high (active) and the control input is low (inactive).

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A dual mode ionization detection circuit responsive to a received control signal, the ionization detection circuit comprising:
   an ionization detector suitable for placement in proximity to combustion;
   a dual gain amplifier circuit coupled to receive an ionization signal from the ionization detector and amplify at least a portion of the ionization signal at a selected one of plural selectable gains, selection of gain being based upon the received control signal.

2. The dual mode ionization detection circuit of claim 1, wherein the control signal is received from a powertrain control module.

3. A dual mode ionization detection circuit responsive to a received control signal, the ionization detection circuit comprising:
- an ionization detector suitable for placement in proximity to combustion;
- a dual gain current mirror circuit connected to the ionization detector to mirror an ionization current of the ionization detector and amplify at least a portion of the ionization current at a selected one of plural selectable gains, selection of gain being based upon the received control signal.

4. The dual mode ionization detection circuit of claim 1, wherein the control signal is received from a powertrain control module.

5. A dual mode ionization detection circuit responsive to a received control signal, the ionization detection circuit comprising:
- an ionization detector suitable for placement in proximity to combustion;
- a dual bias voltage circuit connected to the ionization detector to supply electrical bias to the ionization detector at a selected one of plural selectable bias voltages, selection of bias voltage being based upon the received control signal;
- a dual gain amplifier circuit coupled to receive an ionization signal from the ionization detector and amplify at least a portion of the ionization signal at a selected one of plural selectable gains, selection of gain being based upon the received control signal.

6. The dual mode ionization detection circuit of claim 1, wherein the control signal is received from a powertrain control module.

7. A dual mode ionization detection circuit responsive to a received bias control signal and a received gain control signal, the ionization detection circuit comprising:
- an ionization detector suitable for placement in proximity to combustion;
- a dual bias voltage circuit connected to the ionization detector to supply electrical bias to the ionization detector at a selected one of plural selectable bias voltages, selection of bias voltage being based upon the received bias control signal;
- a dual gain amplifier circuit coupled to receive an ionization signal from the ionization detector and amplify at least a portion of the ionization signal at a selected one of plural selectable gains, selection of gain being based upon the received gain control signal.

8. The dual mode ionization detection circuit of claim 1, wherein the bias control signal and gain control signal are received from a powertrain control module.

* * * * *